United States Patent
Wang et al.

(10) Patent No.: US 12,482,831 B2
(45) Date of Patent: Nov. 25, 2025

(54) NITROGEN-DOPED GRAPHITIZED CARBON MATERIAL AND PREPARATION METHOD

(71) Applicant: GRINM (Guangdong) Institute for Advanced Materials and Technology, Foshan (CN)

(72) Inventors: Rongyue Wang, Foshan (CN); Xuanxuan Bi, Jining (CN); Zhongwei Chen, Dalian (CN)

(73) Assignee: GRINM (Guangdong) Institute for Advanced Materials and Technology, Foshan (CN)

( * ) Notice: Subject to any disclaimer, the term of this patent is extended or adjusted under 35 U.S.C. 154(b) by 0 days.

(21) Appl. No.: 19/017,805

(22) Filed: Jan. 13, 2025

(65) Prior Publication Data

US 2025/0233166 A1    Jul. 17, 2025

Related U.S. Application Data

(63) Continuation of application No. PCT/CN2024/140160, filed on Dec. 18, 2024.

(30) Foreign Application Priority Data

Dec. 27, 2023   (CN) .......................... 202311819945.1

(51) Int. Cl.
*H01M 4/90*        (2006.01)

(52) U.S. Cl.
CPC ................................ *H01M 4/9083* (2013.01)

(58) Field of Classification Search
CPC . B01J 21/18; B01J 23/745; B01J 23/75; B01J 23/755; B01J 23/28; B01J 23/34; B01J 23/06; H01M 4/9083; C01B 32/188

(Continued)

(56) References Cited

U.S. PATENT DOCUMENTS

2020/0388460 A1* 12/2020 Taylor .................... H01J 3/022
2023/0271840 A1*  8/2023 Wu ....................... C25B 11/065
                                                            429/480

FOREIGN PATENT DOCUMENTS

CN         107685150 A  *  2/2018  ............ B22F 1/0025
CN         109616640 A  *  4/2019  ............. C01B 32/21
(Continued)

OTHER PUBLICATIONS

Shuai Chen et al., "N-doped graphitized carbon-coated Fe2O3 nanoparticles in highly graphitized carbon hollow fibers for advanced lithium-ion batteries anodes." Electrochimica Acta 467, pp. 1-11. (Year: 2023).*

*Primary Examiner* — Patricia L. Hailey

(57) ABSTRACT

A nitrogen-doped graphitized carbon material and a preparation method thereof are provided. The preparation method includes the following steps: adding graphitized carbon, pyrrole, concentrated hydrochloric acid and a non-noble metal ion compound into water sequentially in that order and mixing uniformly to obtain a mixture, and finally adding an ammonium persulfate solution into the mixture to prepare polypyrrole-coated graphitized carbon, and performing high-temperature annealing treatment and washing on the polypyrrole-coated graphitized carbon to prepare the nitrogen-doped graphitized carbon material. The prepared nitrogen-doped graphitized carbon material includes a coating layer and a substrate, the coating layer is coated on a surface of the substrate, the coating layer is epitaxially grown graphitized nitrogen-doped carbon, and the substrate is graphitized carbon. The substrate and the coating layer of the nitrogen-doped graphitized carbon material have higher graphitization degree as a whole, and the stability of the carbon material is improved.

10 Claims, 4 Drawing Sheets

(58) Field of Classification Search
USPC .................................................... 502/1, 182
See application file for complete search history.

(56) References Cited

FOREIGN PATENT DOCUMENTS

| | | | | | |
|---|---|---|---|---|---|
| CN | 113410475 | A | * | 9/2021 | ............. B82Y 30/00 |
| CN | 115394971 | A | * | 11/2022 | .......... H01M 10/052 |
| CN | 116726901 | A | * | 9/2023 | .............. B01J 21/18 |
| CN | 117049540 | A | * | 11/2023 | ........... C01B 32/318 |
| CN | 117756091 | A | * | 3/2024 | ............. C01B 32/05 |

\* cited by examiner

NITROGEN-DOPED GRAPHITIZED CARBON MATERIAL AND PREPARATION METHOD

CROSS-REFERENCE TO RELATED APPLICATION

The application claims priority to Chinese Patent Application No. 202311819945.1, filed on Dec. 27, 2023, which is herein incorporated by reference in its entirety.

TECHNICAL FIELD

The disclosure relates to the technical field of fuel cells, and more particularly to a nitrogen-doped graphitized carbon material and a preparation method thereof.

BACKGROUND

The use of sustainable energy can effectively alleviate the environmental pollution and greenhouse effect problems faced by human beings at present. Hydrogen energy has an energy density more than three times that of petroleum, and is regarded as one of the important key technologies for the future energy revolution. As the most promising direction of hydrogen energy application, hydrogen-oxygen fuel cells can effectively convert hydrogen energy into electric energy, with the advantages of high energy conversion efficiency, zero emission and no noise. They are expected to be widely used in automobiles, power stations, portable equipment, aerospace vehicles, and other energy conversion devices.

Proton exchange membrane fuel cells use hydrogen in the anode and oxygen in the cathode from air as energy sources, which can convert the chemical energy of hydrogen into electric energy. However, at present, the process of oxygen reduction reaction (ORR) in the cathode is relatively slow, and it is necessary to use catalysts to reduce the reaction overpotential. The most commonly used ORR catalyst is platinum-carbon catalyst. Compared with other types of catalysts, the platinum-carbon catalyst has higher catalytic activity and better stability. However, the durability of commercial platinum-carbon catalyst is still the main factor restricting its long-term use in the fuel cells. Due to the poor stability of carbon materials, carbon support in the catalyst will be corroded in the catalytic process, especially in acidic solution at high voltage, which will make platinum nanoparticles loaded on the carbon support fall off and the catalytic activity will be greatly attenuated, resulting in poor durability of the platinum-carbon catalysts. Therefore, stable carbon materials are the key to ensuring the high stability of the catalysts.

One of the important means to improve the stability of carbon materials is to graphitize carbon materials, and the ordered graphitized structure will effectively resist the corrosion of carbon materials in an acidic environment. At present, graphitized carbon has been used in commercial catalysts, such as Tanaka Precious Metals catalysts. Compared with other commercial catalysts, this kind of catalyst shows better stability although its activity is reduced. The ordered structure of graphitized carbon will lead to the decrease of surface defect sites, thus reducing the anchoring effect of platinum or platinum-based alloys. Moreover, the lower specific surface area will make the surface platinum or platinum-based alloys particles easy to agglomerate and reduce the catalytic performance. Therefore, it is particularly important to modify the surface of graphitized carbon. However, substances that generally modify the surface of graphitized carbon, such as nitrogen-doped carbon materials, are easy to corrode and decompose in the acidic environment because of their low graphitization degree, which leads to the fall-off of metal nano-materials and poor stability.

Therefore, the improvement and development are still needed in the related art.

SUMMARY

In view of the shortcomings of the related art, the purpose of the disclosure is to provide a nitrogen-doped graphitized carbon material and a preparation method thereof, aiming at solving the problem that the stability of the existing graphitized carbon needs to be improved.

Technical solutions of the disclosure are as follows.

Specifically, a preparation method of a nitrogen-doped graphitized carbon material includes the following steps.

Graphitized carbon, pyrrole, concentrated hydrochloric acid and a non-noble metal ion compound are added into water sequentially in that order and mixed uniformly to obtain a mixture. Finally, an ammonium persulfate solution is added into the mixture to obtain a mixing solution to thereby prepare polypyrrole-coated graphitized carbon. High-temperature annealing treatment and washing are performed on the polypyrrole-coated graphitized carbon to prepare the nitrogen-doped graphitized carbon material.

According to the preparation method of the nitrogen-doped graphitized carbon material, the prepared nitrogen-doped graphitized carbon material includes a coating layer and a substrate. The coating layer is coated on a surface of the substrate, the coating layer is epitaxially grown graphitized nitrogen-doped carbon, and the substrate is graphitized carbon. The substrate and the coating layer of the nitrogen-doped graphitized carbon material in the disclosure have higher graphitization degree as a whole, and the stability of the carbon material is highly improved.

According to the preparation method of the nitrogen-doped graphitized carbon material, during the high-temperature annealing treatment, the temperature is in a range of 700-2000° C. and treatment time is in a range of 0.5-6 hours (h).

In the disclosure, by adding non-noble metal ions to promote epitaxial growth and annealing at 700-2000° C., a nitrogen-doped carbon coating layer with high graphitization degree can be formed.

According to the preparation method of the nitrogen-doped graphitized carbon material, 100 milligrams (mg) to 1 kilogram (kg) of the graphitized carbon, 0.5 milliliters (mL) to 1 liter (L) of the pyrrole and 0.1 grams (g) to 500 g of the non-noble metal ion compound are correspondingly added to every 10 mL to 10 L of the water.

According to the preparation method of the nitrogen-doped graphitized carbon material, 1 mL to 1 L of the concentrated hydrochloric acid and 10 mL to 10 L of the ammonium persulfate solution with a concentration of 0.1-5 moles per liter (M) are added to every 10 mL to 10 L of the water.

According to the preparation method of the nitrogen-doped graphitized carbon material, the non-noble metal ion compound is one or more than two of chloride, acetate, nitrate and oxide containing non-noble metal ions.

The non-noble metal ions include one selected from the group consisting of cobalt ions, iron ions, nickel ions, manganese ions, zinc ions and molybdenum ions.

According to the preparation method of the nitrogen-doped graphitized carbon material, a preparation process of the graphitized carbon includes the following steps:

keeping a temperature of a carbon material at 1400-2500° C. for 0.5-6 h under a protection of one of inert gases or nitrogen to obtain the graphitized carbon.

According to the preparation method of the nitrogen-doped graphitized carbon material, before the performing high-temperature annealing treatment, the preparation method further includes the following steps:

stirring the mixing solution at room temperature for 0.5-6 h to obtain the stirred mixing solution, heating the stirred mixing solution to 90° C., and stirring the heated mixing solution to evaporate the water.

According to the preparation method of the nitrogen-doped graphitized carbon material, a process of the washing is washing the polypyrrole-coated graphitized carbon with 0.5 M sulfuric acid solution and then washing with water for three times.

According to the preparation method of the nitrogen-doped graphitized carbon material, after the washing, the preparation method further includes the following steps:

performing drying treatment on the polypyrrole-coated graphitized carbon; and where during the drying treatment, a temperature is in a range of 50-120° C.

A nitrogen-doped graphitized carbon material is prepared by the preparation method of the nitrogen-doped graphitized carbon material as described above. The nitrogen-doped graphitized carbon material includes a coating layer and a substrate. The coating layer is prone to epitaxially grown graphitized nitrogen-doped carbon, and the substrate is graphitized carbon.

The preparation method of the nitrogen-doped graphitized carbon material has the advantages as follows. The coating layer of graphitized nitrogen-doped carbon can be epitaxially grown on the substrate of graphitized carbon, and the graphitized nitrogen-doped carbon grown based on the graphitized structure of the substrate of graphitized carbon. The substrate and the coating layer of the nitrogen-doped graphitized carbon material in the disclosure have higher graphitization degree as a whole, and the stability of the carbon material is highly improved.

DETAILED DESCRIPTION OF EMBODIMENTS

Figure 1:
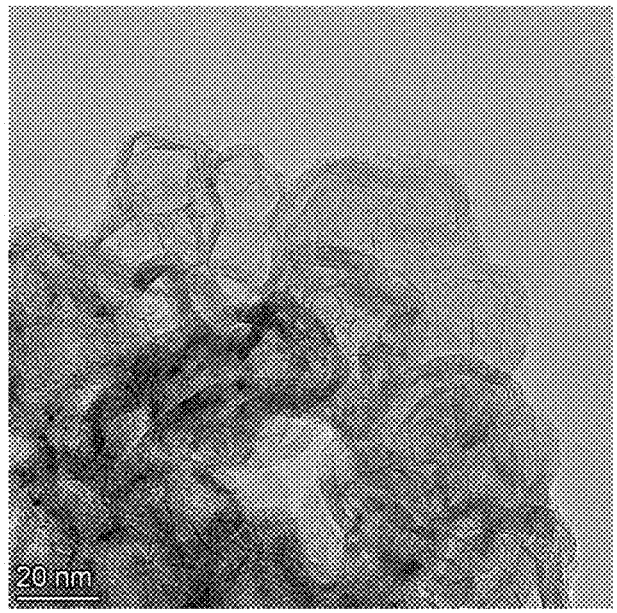
FIG. 1 illustrates a transmission electron microscopy (TEM) diagram of a nitrogen-doped graphitized carbon material prepared in an embodiment 1 of the disclosure.
Figure 2:
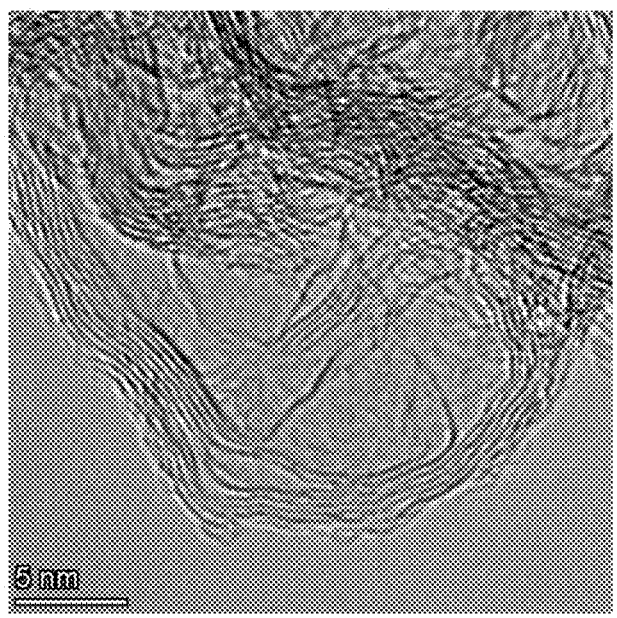
FIG. 2 illustrates a TEM diagram of a nitrogen-doped graphitized carbon material prepared in an embodiment 2 of the disclosure.
Figure 3:
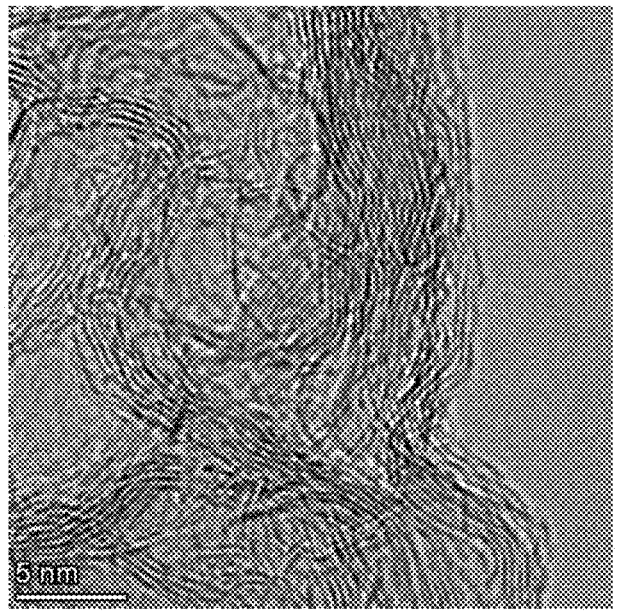
FIG. 3 illustrates a TEM diagram of a nitrogen-doped graphitized carbon material prepared in an embodiment 3 of the disclosure.
Figure 4:
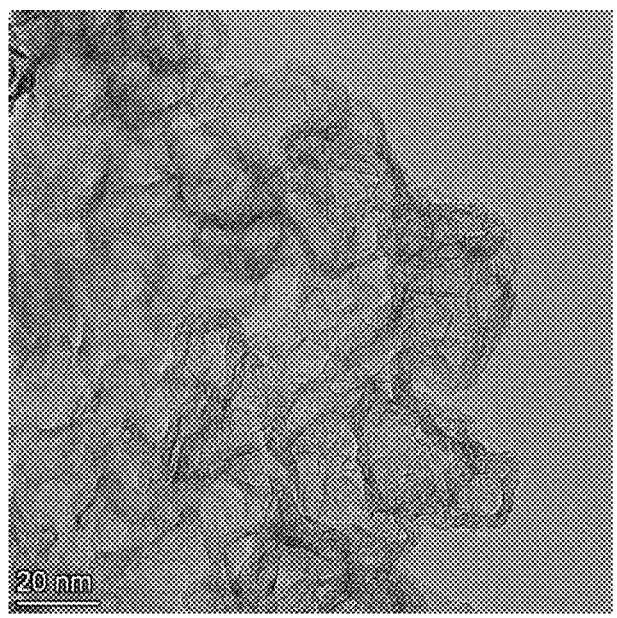
FIG. 4 illustrates a TEM diagram of a nitrogen-doped graphitized carbon material prepared in an embodiment 4 of the disclosure.

The disclosure provides a nitrogen-doped graphitized carbon material and a preparation method thereof. In order to make the purposes, technical solutions and effects of the disclosure clearer and more definite, the disclosure is further described in detail below. It should be understood that the specific embodiments described herein are only used to explain the disclosure, and are not used to limit the disclosure.

The existing common carbon materials have low graphitization degree and poor stability as carriers in fuel cell catalysts. However, the surface of graphitized carbon lacks defect sites, and its anchoring effect with metal catalysts is poor, which easily leads to the dissolution and re-deposition of metals in the catalytic process. At the same time, the specific surface area of graphitized carbon is low, and the ability of dispersing metal catalysts is poor, which easily leads to the agglomeration of metal nano-materials during the preparation of catalysts. However, substances that generally modify the surface of graphitized carbon, such as nitrogen-doped carbon materials, are easy to corrode and decompose in an acidic environment because of their low graphitization degree, which leads to the fall-off of metal nano-materials and poor stability.

The disclosure provides a preparation method of a nitrogen-doped graphitized carbon material, including the following steps.

The graphitized carbon, pyrrole, concentrated hydrochloric acid and non-noble metal ion compounds are added into water sequentially in that order and mixed uniformly to obtain a mixture. Finally, an ammonium persulfate solution is added into the mixture to obtain a mixing solution to thereby prepare polypyrrole-coated graphitized carbon, and high-temperature annealing treatment and washing is performed on the polypyrrole-coated graphitized carbon to prepare the nitrogen-doped graphitized carbon material. The nitrogen-doped graphitized carbon material is graphitized carbon coated with epitaxially grown graphitized nitrogen-doped carbon.

According to the preparation method of the nitrogen-doped graphitized carbon material, the prepared nitrogen-doped graphitized carbon material includes a coating layer and a substrate. The coating layer is coated on the surface of the substrate, the coating layer is epitaxially grown graphitized nitrogen-doped carbon, and the substrate is graphitized carbon. According to the preparation method of the nitrogen-doped graphitized carbon material, the coating layer of graphitized nitrogen-doped carbon can be epitaxially grown on the substrate of graphitized carbon, and the coating layer of graphitized nitrogen-doped carbon is grown based on the graphitized structure of the substrate of graphitized carbon. Both the substrate and the coating layer of the nitrogen-doped graphitized carbon material in the disclosure have high graphitization degree, which can inhibit the corrosion of the carbon material in the operation of the fuel cell. The preparation method of the nitrogen-doped graphitized carbon material has the advantages of simple operation, less processes, good repeatability and low cost, and is beneficial to mass production.

In the technical solution of the disclosure, the graphitized carbon is obtained by graphitizing existing carbon materials.

The existing carbon materials can be carbon powder or amorphous carbon, and can be commercial carbon materials commonly used in the market, such as Ketjen Black 600 (also referred to as Ketjenblack® EC-600JD), Ketjen Black 300 (also referred to as Ketjenblack® EC-300J), Bp2000 (also referred to as BLACK PEARLS® 2000), Vulcan® XC72, Toray® carbon, etc.

In an embodiment, graphitization treatment specifically includes the following steps.

The carbon material is kept at 1400-2500° C. for 0.5-6 h under the protection of one of inert gases or nitrogen to obtain the graphitized carbon.

The prepared graphitized carbon has a certain graphitized structure and a high specific surface area. In an embodiment, non-noble metal ions include one of cobalt ions, iron ions, nickel ions, manganese ions, zinc ions, molybdenum ions and the like, and the non-noble metal ion compound can be one or more than two of non-aqueous or hydrates containing non-noble metal ions, such as chlorides, acetates, nitrates, oxides and the like. The addition of metal ions will make the nitrogen-doped carbon layer on the surface grow epitaxially according to the crystalline form of the substrate of graphitized carbon, so that the whole carbon material has a high degree of graphitization from the inside out and the stability of the carbon material is improved.

In an embodiment, during the high-temperature annealing treatment, the temperature is 700-2000° C. and the treatment time is 0.5-6 h. In the disclosure, by adding non-noble metal ions to promote epitaxial growth and performing high-temperature annealing treatment at 700-2000° C., a nitrogen-doped carbon coating layer with high graphitization degree can be formed.

During the high-temperature annealing treatment, it is specifically carried out under the protection of inert gas. The inert gas can be argon (Ar) or the like.

In an embodiment, the dosage ratio of pyrrole, ammonium persulfate, graphitized carbon, non-noble metal ion compound and concentrated hydrochloric acid ranges from 100 mg to 1 kg of graphitized carbon, 0.5 mL to 1 L of pyrrole, 0.1 g to 500 g of non-noble metal ion compound, 1 mL to 1 L of concentrated hydrochloric acid and 10 mL to 10 L of ammonium persulfate solution with a concentration of 0.1-5 M to each 10 mL to 10 L of water. The above dosage range is basically the minimum amount to the maximum amount of each raw material. In this range, with the increase of raw material dosage, the amount of synthesized nitrogen-doped surface porous carbon material will also increase accordingly. Among them, the concentration of concentrated hydrochloric acid should be 36%-38%, and the concentrated hydrochloric acid purchased is used directly without dilution.

In an embodiment, before the high-temperature annealing treatment, the method includes the following steps: stirring the mixing solution at room temperature for 0.5-6 h to obtain the stirred mixing solution, heating the stirred mixing solution to 90° C., and stirring the heated mixing solution to evaporate the water.

In an embodiment, the process of the washing is washing the polypyrrole-coated graphitized carbon with 0.5 M sulfuric acid solution and then washing with water for three times. After washing, drying treatment can also be performed. In an embodiment, during the drying treatment, the temperature range is in a range of 50-100° C.

In an embodiment, the process of adding graphitized carbon, pyrrole, concentrated hydrochloric acid and non-noble metal ion compound into water in turn and mixing uniformly, and finally adding ammonium persulfate solution, specifically, adding graphitized carbon and pyrrole into water in turn, mixing uniformly, then adding concentrated hydrochloric acid to adjust pH value and non-noble metal ion compound, and finally adding ammonium persulfate solution. The way of uniform mixing can be ultrasonic dispersion or uniform stirring.

The disclosure also provides a nitrogen-doped graphitized carbon material, which is prepared by the preparation method of the nitrogen-doped graphitized carbon material. The nitrogen-doped graphitized carbon material includes a coating layer and a substrate, the coating layer is coated on the surface of the substrate, the coating layer is epitaxially grown graphitized nitrogen-doped carbon, and the substrate is graphitized carbon. The nitrogen-doped graphitized carbon material has the following advantages.

(1) The graphitized carbon of the substrate itself is difficult to interact with the metal catalyst because of its graphitized carbon structure, and the graphitized nitrogen-doped carbon on the surface of the substrate can interact with the metal catalyst, thus inhibiting the agglomeration and shedding of metal nano-materials in the process of metal loading and oxygen reduction.

(2) The introduction of graphitized nitrogen-doped carbon on the surface of graphitized carbon will provide a higher specific surface area, which is beneficial to the loading and dispersion of surface metal catalysts.

(3) The addition of metal ions will make the nitrogen-doped carbon layer on the surface grow epitaxially according to the graphitized crystalline form of the substrate of graphitized carbon, so that the whole carbon material has a high graphitization degree from the inside out, and the stability of the carbon material is improved.

The disclosure will be further described by specific embodiments.

The graphitized carbon powders in embodiments 1~4 are all prepared by the following methods.

Ketjen Black600 carbon powder is kept at 1800° C. for 1 h under the protection of argon to obtain graphitized carbon powder.

Embodiment 1

1 g of graphitized carbon powder, 2 mL of pyrrole, 10 mL of concentrated hydrochloric acid and 3.34 g of cobalt chloride hexahydrate are sequentially added into water, stirred evenly, then 40 mL of 0.5 M ammonium persulfate solution is added, stirred at room temperature for 1 h, and then heated to 90° C. and stirred to evaporate water, so as to obtain a carbon mixture (i.e., the polypyrrole-coated graphitized carbon). The carbon mixture is treated at 800° C. for 2 h under the protection of argon to obtain a sample. The obtained sample is washed with 0.5 M sulfuric acid solution and then washed with water for three times. After drying at 60° C., the nitrogen-doped graphitized carbon material is obtained, in which the mass ratio of nitrogen-doped graphitized carbon of the coating layer to graphitized carbon of the substrate is about 1:1.

Embodiment 2

1 g of graphitized carbon powder, 1 mL of pyrrole, 10 mL of concentrated hydrochloric acid and 2.2 g of ferric chloride hexahydrate are sequentially added into water, stirred evenly, then 40 mL of 0.5 M ammonium persulfate solution is added, stirred at room temperature for 1 h, and then heated to 90° C. and stirred to evaporate water, so as to obtain a carbon mixture. The carbon mixture is treated at 900° C. for 2 h under the protection of argon to obtain a sample. The obtained sample is washed with 0.5 M sulfuric acid solution and then washed with water for three times. After drying at 60° C., the nitrogen-doped graphitized carbon material is obtained, in which the mass ratio of nitrogen-doped graphitized carbon of the coating layer to graphitized carbon of the substrate is about 1:2.

Embodiment 3

2 g of graphitized carbon powder, 1 mL of pyrrole, 10 mL of concentrated hydrochloric acid and 4.44 g of zinc nitrate are sequentially added into water, and then 40 mL of 0.5 M ammonium persulfate solution is added, stirred at room temperature for 1 h, and then heated to 90° C. and stirred to evaporate water, so as to obtain a carbon mixture. The carbon mixture is treated at 1200° C. for 2 h under the protection of argon to obtain a sample. The obtained sample is washed with 0.5 M sulfuric acid solution and then washed with water for three times. After drying at 60° C., the nitrogen-doped graphitized carbon material is obtained, in which the mass ratio of nitrogen-doped graphitized carbon of the coating layer to graphitized carbon of the substrate is about 1:4.

Embodiment 4

20 g of graphitized carbon powder, 10 mL of pyrrole, 100 mL of concentrated hydrochloric acid and 95 g of manganese acetate are sequentially added into water, and then 400 mL of 0.5 M ammonium persulfate solution is added, stirred at room temperature for 1 h, and then heated to 90° C. and stirred to evaporate water, so as to obtain a carbon mixture. The carbon mixture is treated at 800° C. for 2 h under the protection of argon to obtain a sample. The obtained sample is washed with 0.5 M sulfuric acid solution and then washed with water for three times. After drying at 60° C., the nitrogen-doped graphitized carbon material is obtained, in which the mass ratio of the nitrogen-doped graphitized carbon of the coating layer to graphitized carbon of the substrate is about 1:4.

Comparative Embodiment 1

The preparation method is the same as in the embodiment 1, except that cobalt chloride hexahydrate is not added.

Figure 5:
FIG. 5 illustrates a TEM diagram of a nitrogen-doped graphitized carbon material prepared in a comparative embodiment 1 of the disclosure.
Figure 6:
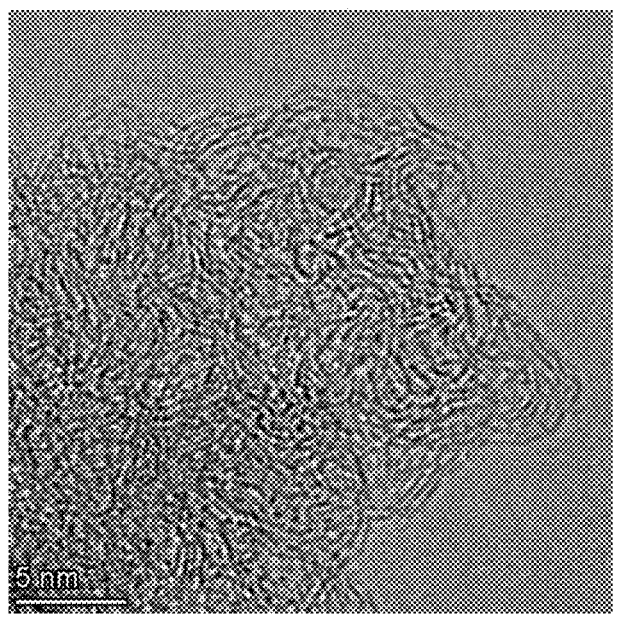
FIG. 6 illustrates another TEM diagram of the nitrogen-doped graphitized carbon material prepared in the comparative embodiment 1 of the disclosure.

TEM diagrams of the nitrogen-doped graphitized carbon materials prepared in the embodiments 1~4 and the comparative embodiment 1 are shown in FIGS. 1-6, in which FIGS. 1-4 are TEM diagrams of the nitrogen-doped graphitized carbon materials prepared in the embodiments 1-4, and FIGS. 5-6 are TEM diagrams of the nitrogen-doped graphitized carbon materials prepared in the comparative embodiment 1. As can be seen from FIGS. 1-4, the graphitized nitrogen-doped carbon of the outer coating layer grows on the graphitized carbon substrate by epitaxial growth, which shows that the coating layer grows epitaxially on the graphitized carbon substrate after adding metal ions to assist in forming the nitrogen-doped carbon, so that the nitrogen-doped carbon of the coating layer has an obvious graphitized structure, to make the whole material have a high graphitization degree and improve the material stability. As can be seen from FIGS. 5-6, the nitrogen-doped graphitized carbon material synthesized without metal ions has no obvious continuous layered graphitized structure.

Figure 7:
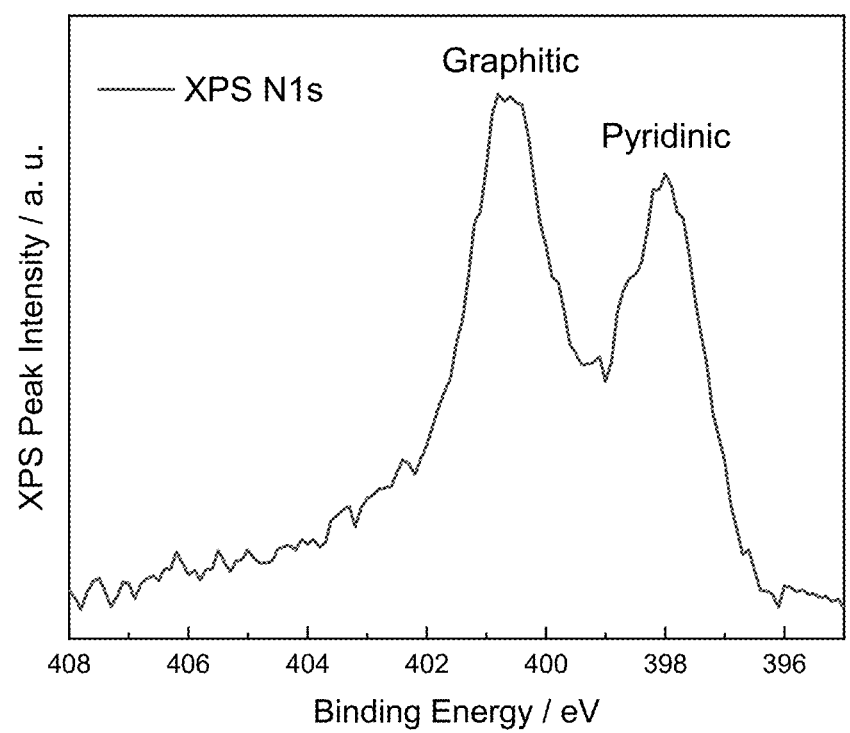
FIG. 7 illustrates an X-ray photoelectron spectroscopy nitrogen 1s spectrum (XPS N1s) of the nitrogen-doped graphitized carbon material prepared in the embodiment 2 of the disclosure.

FIG. 7 is the XPS N1s spectrum of the nitrogen-doped graphitized carbon material prepared in the embodiment 2. The spectrum shows the appearance of nitrogen in the nitrogen-doped graphitized carbon material and the coordination of nitrogen on the surface of the coating layer, mainly in the form of graphitic nitrogen and pyridinic nitrogen, and the unstable pyridinic nitrogen does not appear, indicating that nitrogen appears in a stable form on the surface of the coating layer, and also indicating that the nitrogen-doped graphitized carbon material has high stability.

The specific surface area and pore capacity of raw graphitized carbon powder and nitrogen-doped graphitized carbon materials prepared in the embodiments 1-3 are tested, and the results are shown in Table 1. As can be seen from Table 1, compared with graphitized carbon powder, the specific surface area and pore capacity of the nitrogen-doped graphitized carbon materials prepared in the embodiments 1-3 are significantly increased. The surface graphitized nitrogen-doped carbon can provide a higher specific surface area for the nitrogen-doped graphitized carbon materials, which is beneficial to the loading of metal particles. Moreover, the preparation method provided by the disclosure uses a relatively simple preparation method (one-pot procedure), can be produced in batches, and is beneficial to industrial application.

TABLE 1

| Source sample | S(BET) (m²/g) | V(total) (cm³/g) |
|---|---|---|
| Graphitized carbon powder | 450 | 1.441 |
| Nitrogen-doped graphitized carbon material of embodiment 1 (Nitrogen-doped carbon: graphitized carbon = 1:1) | 680 | 2.293 |
| Nitrogen-doped graphitized carbon material of embodiment 2 (Nitrogen-doped carbon: graphitized carbon = 1:2) | 572 | 1.947 |
| Nitrogen-doped graphitized carbon material of embodiment3 (Nitrogen-doped carbon: graphitized carbon= 1:4) | 555 | 1.900 |

It should be understood that the disclosure is not limited to the above-mentioned embodiments, and those skilled in the art can make improvements or changes according to the above description, and all these improvements and changes should belong to the protection scope of the disclosure.

What is claimed is:

1. A preparation method of a nitrogen-doped graphitized carbon material, comprising the following steps:
   adding graphitized carbon, pyrrole, concentrated hydrochloric acid and a non-noble metal ion compound into water sequentially in that order and mixing uniformly to obtain a mixture, and finally adding an ammonium persulfate solution into the mixture to obtain a mixing solution to thereby prepare polypyrrole-coated graphitized carbon, and performing high-temperature annealing treatment and washing on the polypyrrole-coated graphitized carbon to prepare the nitrogen-doped graphitized carbon material;
   wherein the non-noble metal ion compound is one or more than two of chloride, acetate, nitrate and oxide containing non-noble metal ions; and
   wherein the non-noble metal ions comprise one selected from the group consisting of cobalt ions, iron ions, nickel ions, manganese ions, zinc ions, and molybdenum ions.

2. The preparation method of the nitrogen-doped graphitized carbon material as claimed in claim 1, wherein during the high-temperature annealing treatment, the temperature is in a range of 700-2000° C. and treatment time is in a range of 0.5-6 hours (h).

3. The preparation method of the nitrogen-doped graphitized carbon material as claimed in claim 1, wherein 100 milligrams (mg) to 1 kilogram (kg) of the graphitized carbon, 0.5 milliliters (mL) to 1 liter (L) of the pyrrole and 0.1 grams (g) to 500 g of the non-noble metal ion compound are correspondingly added to every 10 mL to 10 L of the water.

4. The preparation method of the nitrogen-doped graphitized carbon material as claimed in claim 1, wherein 1 mL to 1 L of the concentrated hydrochloric acid and 10 mL to 10 L of the ammonium persulfate solution with a concentration of 0.1-5 moles per liter (M) are added to every 10 mL to 10 L of the water.

5. The preparation method of the nitrogen-doped graphitized carbon material as claimed in claim 1, wherein a preparation process of the graphitized carbon comprises the following step:
keeping a temperature of a carbon material at 1400-2500° C. for 1 h under a protection of argon to obtain the graphitized carbon.

6. The preparation method of the nitrogen-doped graphitized carbon material as claimed in claim 1, before the performing high-temperature annealing treatment, further comprising the following steps:
stirring the mixing solution at room temperature for 1 h to obtain the stirred mixing solution, heating the stirred mixing solution to 90° C., and stirring the heated mixing solution to evaporate the water.

7. The preparation method of the nitrogen-doped graphitized carbon material as claimed in claim 1, wherein a process of the washing is washing the polypyrrole-coated graphitized carbon with 0.5 M sulfuric acid solution and then washing with water for three times.

8. The preparation method of the nitrogen-doped graphitized carbon material as claimed in claim 1, after the washing, further comprising the following steps:
performing drying treatment on the polypyrrole-coated graphitized carbon;
wherein during the drying treatment, a temperature in is a range of 50-100° C.

9. A nitrogen-doped graphitized carbon material, prepared by the preparation method of the nitrogen-doped graphitized carbon material as claimed in claim 1, comprising a coating layer and a substrate, wherein the coating layer is epitaxially grown graphitized nitrogen-doped carbon, and the substrate is the graphitized carbon.

10. The nitrogen-doped graphitized carbon material as claimed in claim 9, wherein a mass ratio of nitrogen-doped graphitized carbon of the coating layer to the graphitized carbon of the substrate is 1:1, 1:2, or 1:4.

* * * * *